(12) United States Patent
Newlin

(10) Patent No.: US 8,014,506 B2
(45) Date of Patent: Sep. 6, 2011

(54) METHODS AND SYSTEMS FOR COMMUNICATING AND CONTROLLING FACSIMILE INFORMATION

(75) Inventor: Jayson Newlin, Kingston, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 10/943,500

(22) Filed: Sep. 17, 2004

(65) Prior Publication Data

US 2005/0111637 A1    May 26, 2005

Related U.S. Application Data

(63) Continuation of application No. 09/745,209, filed on Dec. 21, 2000, now abandoned.

(51) Int. Cl.
*H04M 15/06* (2006.01)

(52) U.S. Cl. ........... 379/142.07; 379/88.13; 379/100.06; 379/905; 455/417; 358/1.15; 358/407

(58) Field of Classification Search ............... 379/93.14, 379/100.09, 211.02, 221.14, 265.01, 93.09, 379/93.11, 265.02, 211.01, 88.12, 179, 252, 379/373.01–373.05, 88.13, 100.06, 88.25, 379/100.01, 100.02, 100.08, 142.07, 144.05, 379/902, 905; 455/417, 567; 709/206, 238; 358/1.15, 400, 407
See application file for complete search history.

(56) References Cited

U.S. PATENT DOCUMENTS

| | | | |
|---|---|---|---|
| 5,033,079 A * | 7/1991 | Catron et al. ............. | 379/93.14 |
| 5,349,636 A | 9/1994 | Irribarren | |
| 5,404,231 A | 4/1995 | Bloomfield | |
| 5,448,626 A | 9/1995 | Kajiya et al. | |
| 5,465,295 A * | 11/1995 | Furman .................... | 379/221.14 |
| 5,479,485 A | 12/1995 | Hayashi | |
| 5,568,536 A | 10/1996 | Tiller et al. | |
| 5,610,910 A | 3/1997 | Focsaneanu et al. | |
| 5,666,403 A | 9/1997 | Telibasa | |
| 5,692,039 A | 11/1997 | Brankley et al. | |
| 5,768,358 A * | 6/1998 | Venier et al. ............. | 379/221.14 |
| 5,889,839 A * | 3/1999 | Beyda et al. ............... | 379/88.12 |
| 5,937,050 A | 8/1999 | Yue et al. | |
| 5,943,400 A | 8/1999 | Park | |
| 6,108,405 A | 8/2000 | Luong | |
| 6,167,123 A | 12/2000 | Kwok et al. | |

(Continued)

OTHER PUBLICATIONS

Web pages from http://www.accessline.com, Nov. 1999, Accessline Technologies.

*Primary Examiner* — Md S Elahee

(74) *Attorney, Agent, or Firm* — Parks IP Law LLC; Mickki D. Murray, Esq.

(57) ABSTRACT

Methods for managing and routine multiple telephone calls through a wireless network provide efficient and cost-effective ways in which a subscriber to the network can take advantage of the multiple services being offered. When the subscriber has only one line in the network, or when the subscriber often uses more than one line, multiple telephone calls may attempt transmission to the subscriber and so the subscriber may miss the call. The inventive methods determine what type of incoming call is attempting to contact the subscriber and routes the call to another location, such as the subscriber's voice mail, if the subscriber is otherwise occupying his or her line or lines in the network. The methods are particular useful for storing and forwarding facsimile messages to subscriber.

6 Claims, 2 Drawing Sheets

U.S. PATENT DOCUMENTS

| | | | |
|---|---|---|---|
| 6,233,448 B1 * | 5/2001 | Alperovich et al. | 455/417 |
| 6,278,775 B1 | 8/2001 | Sih et al. | |
| 6,298,122 B1 | 10/2001 | Horne | |
| 6,330,079 B1 * | 12/2001 | Dugan et al. | 358/403 |
| 6,449,356 B1 * | 9/2002 | Dezonno | 379/265.01 |
| 6,477,243 B1 * | 11/2002 | Choksi et al. | 379/100.06 |
| 6,487,281 B1 | 11/2002 | Crook | |
| 6,546,085 B1 | 4/2003 | Brockman et al. | |
| 6,625,258 B1 * | 9/2003 | Ram et al. | 379/88.13 |
| 6,978,313 B1 * | 12/2005 | Pietrowicz | 709/238 |
| 7,139,558 B1 * | 11/2006 | Palviainen | 455/417 |
| 2001/0043694 A1 * | 11/2001 | Chartrand | 379/211.02 |

* cited by examiner

METHODS AND SYSTEMS FOR COMMUNICATING AND CONTROLLING FACSIMILE INFORMATION

CROSS REFERENCE TO RELATED APPLICATIONS

This application is a continuation of U.S. patent application Ser. No. 09/745,209, filed on Dec. 21, 2000 now abandoned, which is hereby incorporated by reference in its entirety.

BACKGROUND OF THE INVENTION

1. Field of the Invention

This invention relates generally to methods and systems for communicating and controlling data in a network. More specifically, the invention relates to managing and controlling incoming telephone calls to a network when subscribers to the network do not have multiple telephone lines in the network.

2. Description of the Related Art

With the current explosion of wireless technologies and the implementation of sophisticated wireless networks, new wireless services are constantly being offered to wireless subscribers that allow the subscribers to take full advantage of advanced communications over the network. Many of these services require that a telephone call be placed to the subscriber so that the subscriber can access the service through the network. There has thus developed an acute need in the art for ways to manage these incoming telephone calls and ensure that the subscriber receives all of the services that he or she has subscribed to and that are provided by the network.

Typically, a subscriber to a wireless network that is receiving services therefrom only has one line or telephone number through which it can access the network and receive services. However, it will be recognized that at any one time, more than one telephone call, including voice calls, may be attempting to contact the subscriber through the network. Additionally, as service offerings proliferate in wireless networks, it is envisioned that more than one service may attempt to access the subscriber at any one time.

For example, the FAX machine has become a ubiquitous piece of equipment in the office environment. Most businesses and many home users employ FAX machines so that they can stay in communication with business associates, relatives and other people. In fact, FAX services have become an integral part of the plethora of Internet and wireless services that are now available. In fact FAX services in the wireless environment are already readily available to subscribers and so the aforementioned problems have arisen.

Prior approaches to solving these problems have been proposed. For example, separate telephone lines apart from voice telephone lines may be provided to a subscriber that wishes wireless access to FAX machines. However, this is an expensive solution especially when the network over which the FAX signals will be sent is a wireless network. Therefore, it may be desirable to allow FAX and voice signals to be sent over a single channel with one telephone number. In order to accomplish this goal, it will be appreciated that if the user is not available at the telephone, the FAX call may be missed, or if the user is using the phone for voice communications, the FAX call will not go through. A method for overcoming these problems should therefore be devised.

Other prior art approaches to address these issues have relied on detecting a FAX versus a voice call and alerting the user when a FAX call is coming in. The alert may be in the form of a web page sent to the user. In the area of cordless phones which have base units, when the base units include FAX machines the base units may be provided with functionality to differentiate the FAX call from the voice call without interrupting or otherwise alerting the user of the cordless phone. Voice and text storage systems also exist in the art wherein text, such as a FAX, may be stored in a user's mailbox in the system.

None of the aforementioned solutions adequately provide methods and systems for FAX communications continuously to subscribers with only one telephone number for FAX and voice calls. Nor do these solutions automatically store and forward FAX transmissions to a subscriber over a single telephone line when the subscriber is occupying the line with a voice phone call. Moreover, the prior methods and systems for sending FAX signals over a single telephone line do not adequately identify FAX transmissions or alert the subscriber that a FAX has been or will be sent.

There thus exists a long-felt need for methods which store and forward incoming telephone calls when only a single telephone line is available for multiple incoming telephone calls. The methods and systems should identify whether the call is a voice call or some other type of call and notify the user that another type of call FAX has been received. Additionally, it would be desirable if the methods and systems automatically and continuously accepted incoming telephone calls even when the subscriber is using the single line for a voice call. These needs have not heretofore been achieved in the art.

SUMMARY OF THE INVENTION

The aforementioned problems are solved, and long-felt needs met, by methods of managing multiple telephone calls in a network. In a preferred embodiment, the methods receive an incoming call having a first character for a subscriber to the network. It is then determined whether the incoming telephone call has the first character or a second character in order to classify the incoming telephone call. The call is then routed to a location depending upon its classification as a telephone call of the first or second character.

Methods of routing telephone calls in a network also satisfy the aforementioned long-felt needs. Preferably, an incoming telephone call to the network is received that is intended for a subscriber to the network. The incoming call is classified as either a voice call or another type of call. If the call is classified as a voice call, it is routed to the subscriber. However, if the call is classified as another type of call, it is routed to another location. It may then be stored at the other location and forwarded to the subscriber at some future time.

The inventive methods are particularly useful for storing and forwarding of FAX and other incoming telephone calls to subscribers, especially when the subscriber has only a single line in the network. Advantageously, the methods allow automatic and continuous receipt of FAX messages even when the subscriber is using the single line for voice calls. This greatly reduces the costs to the subscriber for receiving FAX transmissions and allows the subscriber great versatility in using the network. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals refer to like elements throughout the several views thereof.

DETAILED DESCRIPTION OF THE PREFERRED EMBODIMENTS

Figure 1:
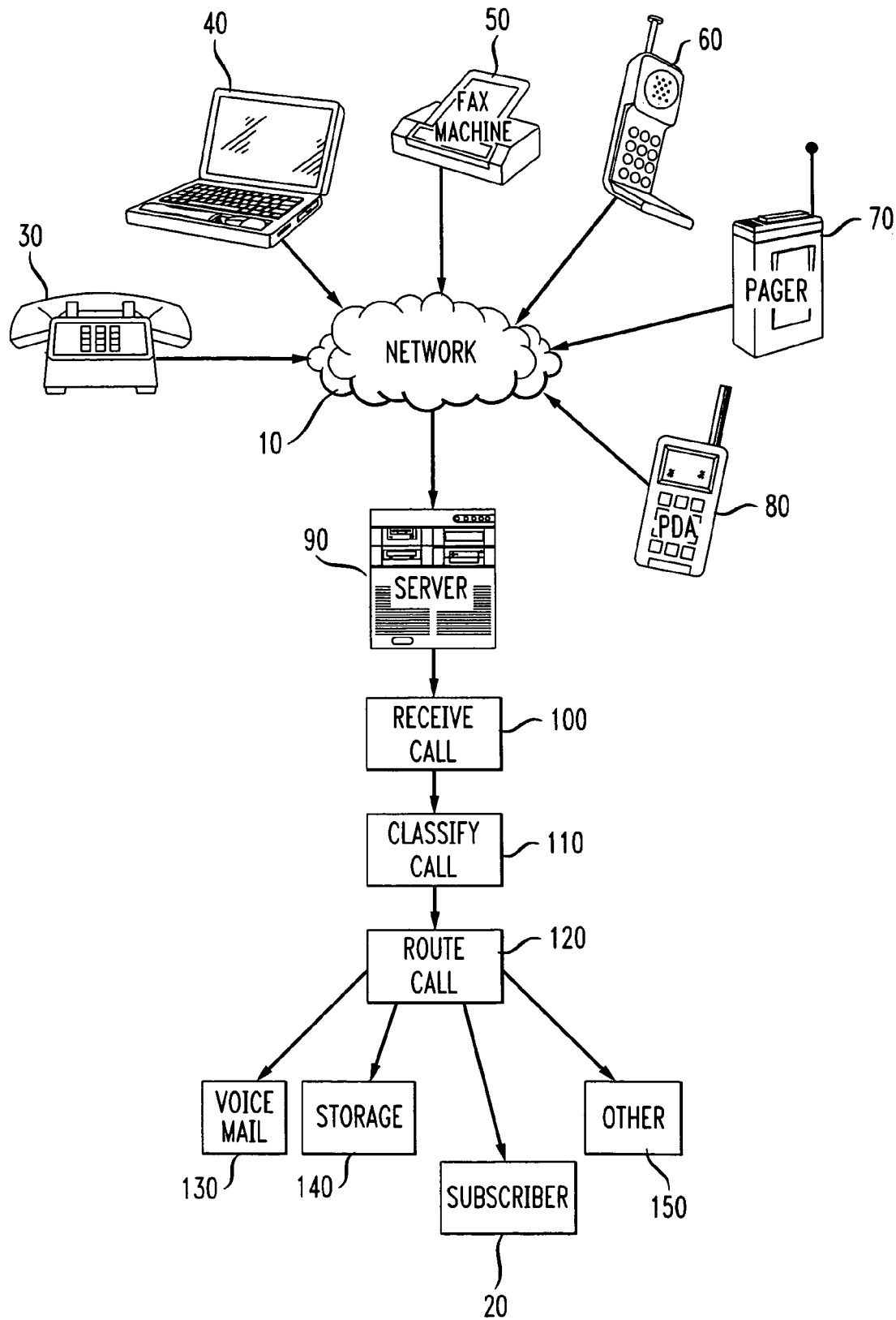
FIG. 1 is a block diagram of a network which implements the inventive methods described herein.

Referring now to FIG. 1, a network 10 is depicted wherein incoming telephone calls can be managed and routed to a desired location depending on the nature and character of the calls as determined and classified by the inventive methods. The network 10 may be any type of computer network such as the Internet, the known switched telephone network, a wireless network, a local area network (LAN), a wide area network (WAN) or other networks through which analog and/or digital communications may take place. For ease of description throughout, network 10 will be described as a wireless network.

A subscriber 20 to wireless network 10 will communicate with the network 10 through a standard wireless device such as a mobile telephone, a personal or laptop computer, a personal digital assistant (PDA) a beeper, a FAX machine, or any other device which is configured to transmit and receive wireless communications. This communication can be received by any communications device as will be described in more detail. Typically, subscriber 20 will only have one wireless telephone line to network 10, but subscriber 20 may subscribe to more than one wireless line. Whether subscriber 20 has access to one or more lines to network 10, there will doubtless be times when all of the subscriber 20's lines are being occupied, or are otherwise in use such that an incoming call to the subscriber 20 through network 10 will not be able to be completed.

This scenario will occur since many other parties and devices may try to contact subscriber 20 at the same time. For example, but not intending to limit the invention in any way, a standard landline telephone 20, a personal or laptop computer 40, a FAX machine 50, a wireless telephone 60, a beeper 70, a PDA (wireless or landline-based) 80, or other devices may be used by others to try and contact subscriber 20 through network 10. Conventionally, a server 90 is associated with network 10 and provides the required functionality to run data and voice communications through network 10. There are many servers that are commercially available on the market today which are used to drive networks, for example, the PROLIANT server sold by Compaq Computer Corp. (Houston, Tex.) may be employed. Other servers are known to those skilled in the art which may also be used to run network 10.

As will be appreciated by those skilled in the art, the inventive methods may be implemented as a software program or programs, or in modules associated with a larger software program such as an operating system for network 10. The software may be written in any appropriate software language such as C++, VISUALBASIC, or others, and may be implemented in any operating system environment such as UNIX, WINDOWS or other operating systems. In a preferred embodiment, server 90 runs the software to perform the inventive methods.

After an incoming call is received by the network 10 and the server 90 is notified thereof, it is desired to process the received call with a processing block for the received call which receives and processes data information associated with the received call. Then, the call is classified by a classification block 110 to determine the nature and character of the call so that it can be routed to the appropriate location. Once classification has taken place, routing module 120 routes the call to the appropriate location either in the network 10, to the subscriber 20, or to some other location outside the network 10.

The classified call can be routed to virtually any location desired, in or out of the network. For example, the call may be directly and immediately routed to subscriber 20. Further, the call may be routed to the subscriber's voice mail 130, to a storage area or device 140 or to any other appropriate location 150 which may later be contacted by the subscriber or others for retrieval or for other actions depending on the nature and/or character of the incoming call.

Figure 2:
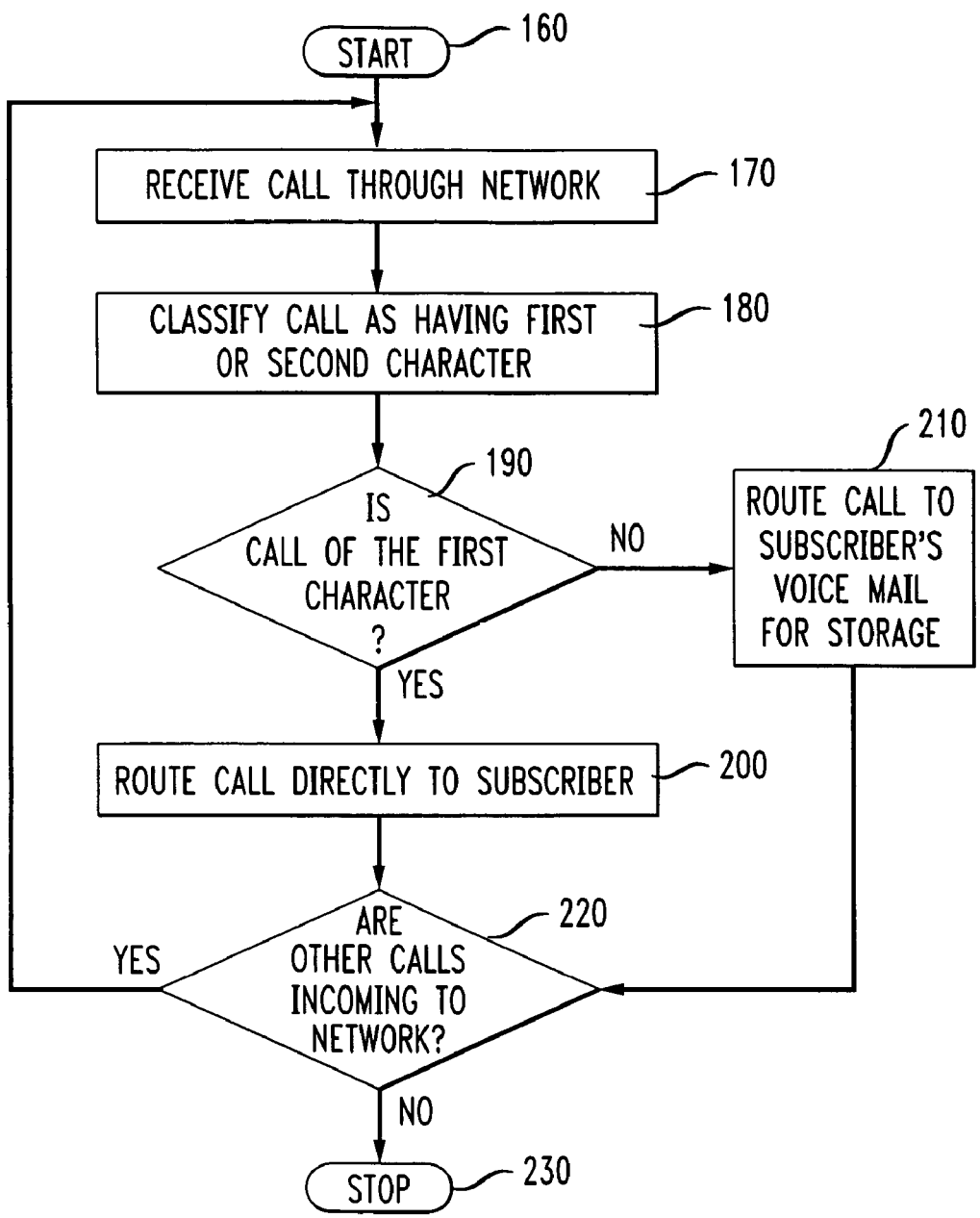
FIG. 2 is a flow chart of a preferred embodiment of the methods provided in accordance with the present invention which can be implemented in software.

As has been mentioned above, the inventive methods may be implemented in software in the appropriate software language. FIG. 2 depicts a flow diagram of a preferred embodiment of a method provided in accordance with the present invention. The method begins at step 160 and at step 170 an incoming call is received through the network. The call is classified at step 180 as having a first or second character. As used herein, the terms "nature" or "character" with respect to the incoming call means the type of call that is incoming to the network. For example, a first character may be a standard voice call. A second character may be a call from a FAX machine, beeper or other device as described in relation to FIG. 1 above. Of course, there may second, third or fourth, etc. character incoming calls which can be classified by the inventive methods and ultimately routed to a location in the network. The invention is not limited to the number or incoming call characters, and the description of FIG. 2 with respect to incoming calls having one of two characters is simply exemplary for illustrative purposes. It will be further appreciated by those skilled in the art that the call characters are programmed in the software and may be added, deleted or modified at any time by the server 90 managers to accommodate the desired architecture of the network 10.

It is then preferably determined at step 190 whether the incoming call is of the first character. If so, then at step 200 the call is routed directly to the subscriber. If not, to then at step 210 the call is routed to the subscriber's voice mail on the network for storage or other action. In this scenario, the call has a second character, for example it is determined to be a FAX machine call, and the first character is a voice mail call. However, it will be further appreciated that these calls may have different characters and may therefore be routed to other locations.

In any event, the method then proceeds to step 220 where it is determined whether there are other incoming calls to the network that must be routed and classified in accordance with the present invention. If so, then the method proceeds back to step 170 for further processing. If not, then the method stops at step 230.

Classification of the character of the incoming call and/or determination of the type of call can occur in several ways. For example, it is known that each of the subscribers to the network are assigned a mobile identification number (MIN) when the network is a wireless network. When an incoming call is received at the network, the network then determines whether the subscriber identified by the MIN has the feature activated that is associated with the character to be determined. For example, if the subscriber desires that FAX transmissions be routed to his or her voice mail, then this option is activated and the system will route FAX transmissions to voice mail after the FAX character of the incoming call has been determined. The determination that the incoming call is a FAX call may be determined by detecting whether or not there are any tones associated with the FAX transmission in the incoming call. If these tones exist, then the call is determined to be a FAX transmission which is preferably automatically routed to voice mail. If no tones are present, the call may be assumed to be a voice call which is directly routed to the subscriber.

Even more preferably, after the FAX call is routed to voice mail, the system notifies the subscriber that a FAX has been received. This may be accomplished a number of ways. For example, the network may send a wireless communication to the subscriber that a FAX communication is in voice mail, or the network may institute a web page communication to the user that the FAX has been placed in voice mail. Moreover, the inventive methods may determine more than one characteristic about the incoming call, for example, how long the communication is, how many FAX pages are associated with the communication, the time and date of the communication, and other characteristics that may be of interest to the subscriber, the network or others. Additional features may also be added, for example, the inventive methods may be modified to allow the subscriber to dial into his or her voice mail to select and forward the communication to another location such as another FAX machine in or out of the network for printing.

Thus, the inventive methods store and forward FAX and other incoming telephone calls to subscribers of a network, especially when the subscriber has only a single line in the network. This provides automatic and continuous receipt of FAX and other messages even when the subscriber is using the single line for voice calls. The inventive methods thereby greatly reduce the costs to the subscriber for receiving FAX transmissions and other message and allow the subscriber great versatility in using the network. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method for managing multiple telephone calls in a cellular network, the method comprising:
   receiving a communication from a mobile telecommunication services subscriber associated with a mobile communication device having a mobile identification number, wherein;
      the communication indicates that the subscriber wants a routing feature activated in connection with calls to the subscriber; and
      the routing feature causes calls to be automatically routed based at least in part on whether the call includes a facsimile transmission;
   activating, in response to receiving the communication, the routing feature for the subscriber, to create an activated routing feature associated with the mobile identification number;
   associating the routing feature with the mobile identification number associated with the subscriber mobile communication device;
   determining, at a server operating on the cellular network, that a call to the subscriber mobile communication device received at the cellular network comprises a facsimile transmission, the determining occurring before the call to the subscriber mobile communication device is connected to the subscriber mobile communication device;
   determining, from call information associated with the call, a called mobile identification number associated with the call;
   correlating, in a correlation, the called mobile identification number, of the call information associated with the call, to the subscriber mobile identification number associated with the routing feature;
   determining whether the subscriber associated with the subscriber mobile communication device has activated the routing feature for automatically routing the incoming facsimile transmission based on the correlation;
   routing the facsimile transmission to a voice mail system associated with the subscriber, without first indicating to the subscriber that the call for the subscriber has been received, if it is determined that the routing feature has been activated by the subscriber;
   sending, following routing of the facsimile transmission to the voicemail system, a notification to the subscriber indicating that the facsimile transmission has been received at the voicemail system, wherein sending the notification includes sending a web page communication; and the notification comprises a characteristic of the facsimile transmission, the characteristic being at least one of a number of received pages, a time at which the facsimile transmission was received, and a date on which the facsimile transmission was received; and
   forwarding the facsimile transmission to a secondary device upon receiving instructions from the subscriber via the voice mail system.

2. The method recited in claim 1, further comprising determining that the call comprises the facsimile transmission when the subscriber is occupying the subscriber's telephone line.

3. The method recited in claim 1, wherein sending the web page communication comprises sending the web page to the subscriber.

4. The method recited in claim 1, wherein the secondary device comprises a facsimile machine.

5. The method recited in claim 1, wherein sending the notification further comprises sending a wireless communication.

6. The method recited in claim 1, wherein the routing feature causes calls to be automatically routed based at least in part on:
   whether the call includes a facsimile transmission; and
   a nature of the incoming call.

* * * * *